United States Patent
Cotton

[11] Patent Number: 5,946,846
[45] Date of Patent: Sep. 7, 1999

[54] SPRING LOADED FISHING APPARATUS

[76] Inventor: Jack Edward Cotton, P. O. Box 430, Pell City, Ala. 35125

[21] Appl. No.: 08/822,787

[22] Filed: Mar. 24, 1997

[51] Int. Cl.⁶ .................................................. A01K 83/02
[52] U.S. Cl. .................................. 43/36; 43/37; 43/42.41
[58] Field of Search ................................ 43/34–37, 42.41

[56] References Cited

U.S. PATENT DOCUMENTS

| | | | |
|---|---|---|---|
| 6,207 | 3/1849 | Johnson . | |
| 321,796 | 7/1885 | Clark | 43/36 |
| 373,991 | 11/1887 | Lockhead . | |
| 806,898 | 12/1905 | Kepler | 43/35 |
| 968,961 | 8/1910 | Lee | 43/44.2 |
| 1,197,820 | 9/1916 | Guise | 43/35 |
| 1,372,831 | 3/1921 | Roderick | 43/35 |
| 1,437,694 | 12/1922 | Traver | 43/35 |
| 1,448,735 | 3/1923 | Edmondson | 43/36 |
| 1,464,215 | 8/1923 | Olson . | |
| 1,467,750 | 9/1923 | Borg | 43/35 |
| 1,479,652 | 1/1924 | Cranstone . | |
| 1,581,548 | 4/1926 | Ruddell | 43/36 |
| 1,609,151 | 11/1926 | Bruenig | 43/35 |
| 1,609,519 | 12/1926 | Lawson | 43/35 |
| 1,622,118 | 3/1927 | Johns | 43/36 |
| 1,623,870 | 4/1927 | Goodgame | 43/36 |
| 1,672,498 | 6/1928 | Otto | 43/35 |
| 2,295,042 | 9/1942 | Llewellyn | 43/35 |
| 2,445,601 | 7/1948 | Carlsen et al. | 43/36 |
| 2,526,288 | 10/1950 | Shields et al. . | |
| 2,854,779 | 10/1958 | Jackson | 43/37 |
| 2,882,639 | 4/1959 | McGarraghy et al. | 43/44.2 |
| 2,897,624 | 8/1959 | Yakel et al. . | |
| 2,949,690 | 8/1960 | Clough | 43/36 |
| 2,976,641 | 3/1961 | Carmosino | 43/35 |
| 3,026,645 | 3/1962 | Burnett | 43/37 |
| 3,059,371 | 10/1962 | Haynie, Sr. | 43/35 |
| 3,100,359 | 8/1963 | Laba | 43/35 |
| 3,757,450 | 9/1973 | Martinez et al. | 43/35 |
| 3,802,114 | 4/1974 | Diebold | 43/37 |
| 3,890,735 | 6/1975 | Serrill | 43/36 |
| 3,975,856 | 8/1976 | Gadbois | 43/36 |
| 4,104,820 | 8/1978 | Bardebes . | |
| 4,163,336 | 8/1979 | Carpenter | 43/37 |
| 5,491,925 | 2/1996 | Carpenter | 43/37 |
| 5,564,216 | 10/1996 | McMillan . | |

*Primary Examiner*—Michael J. Carone
*Assistant Examiner*—Darren Ark
*Attorney, Agent, or Firm*—Kenneth M. Bush; Veal & Associates

[57] ABSTRACT

A spring loaded fishing apparatus formed from an elongated resilient wire. The wire is sharpened at both ends and formed into a W-shaped member having a center portion forming an eyelet for attaching a fishing line. The W-shaped member is inserted into a compression sleeve which collapses the sharpened points on the outer legs toward the eyelet. The sleeve containing the compressed member is then inserted into a cavity formed in a fishing lure. In an alternate embodiment, the compression sleeve can be absent and the W-shaped member can be inserted directly into a cavity formed in the fishing lure, which collapses the sharpened points. When a fish strikes the lure, the resulting force on the fishing line pulls the member partially from the sleeve, or cavity, and the sharpened points of the W-shaped member spring outwardly to engage the mouth of the fish. The member can subsequently be easily removed from the mouth of the fish while minimizing injury to the fish.

1 Claim, 4 Drawing Sheets

: 
SPRING LOADED FISHING APPARATUS

FIELD OF THE INVENTION

The present invention relates to fishing tackle. More particularly, the present invention relates to a spring loaded fishing apparatus.

BACKGROUND OF THE INVENTION

The fish hook is one of the oldest tools used in fishing and various types of hooks are known in the art. Typically, fish hooks are curved or sharply bent, and have a bight portion with a point and barb at one end. In modern sport fishing, it is common practice to catch fish and subsequently release them back into their environment. Because of the design of modern fish hooks, the releasing component of this "catch and release" system can be rather troublesome.

During a successful catch, the point and barb of the fish hook are normally well embedded within the mouth of the fish. To remove the hook the fisherman must typically twist the hook while applying substantial force until the hook is loosed. This removal process can sometimes be very difficult. Additionally, this process also subjects the fish to substantial mouth trauma. Specifically, modern barbed hooks tear the flesh in the fish's mouth as they are being removed.

Prior to the present invention, there has been no fishing apparatus designed for the modern "catch and release" system. Thus, what is needed is an apparatus which is efficient for catching fish yet can be easily removed from the mouth of the fish and which does not unnecessarily injure the fish.

SUMMARY OF THE INVENTION

It is an object of the present invention to provide a spring loaded fishing apparatus which is superior to the modern fish hook in contemporary "catch and release" sport fishing.

It is another object of the present invention to provide a spring loaded fishing apparatus which is more easily removed from a fish's mouth than a typical fish hook.

It is a further object of the present invention to provide a spring loaded fishing apparatus which minimizes the injury to a fish's mouth during removal.

These and other objects of the invention are accomplished through a spring loaded fishing apparatus formed from an elongated resilient wire. The wire is sharpened at both ends and formed into a W-shaped member having a center portion forming an eyelet for attaching a fishing line. The W-shaped member is inserted into a compression sleeve which collapses the sharpened points on the outer legs toward the eyelet. The sleeve containing the compressed member is then inserted into a cavity formed in a fishing lure. In an alternate embodiment, the compression sleeve can be absent and the W-shaped member can be inserted directly into a cavity formed in the fishing lure, which collapses the sharpened points. When a fish strikes the lure, the resulting force on the fishing line pulls the member partially from the sleeve, or cavity, and the sharpened points of the W-shaped member spring outwardly to engage the mouth of the fish. The member can subsequently be easily removed from the mouth of the fish while minimizing injury to the fish.

These and other objects and advantages of the invention will become apparent from the following detailed description of the preferred embodiment of the invention.

BRIEF DESCRIPTION OF THE DRAWINGS

A fishing apparatus embodying features of the invention is described in the accompanying drawings which form a portion of this disclosure and wherein.

DETAILED DESCRIPTION OF THE PREFERRED EMBODIMENT

Figure 1:
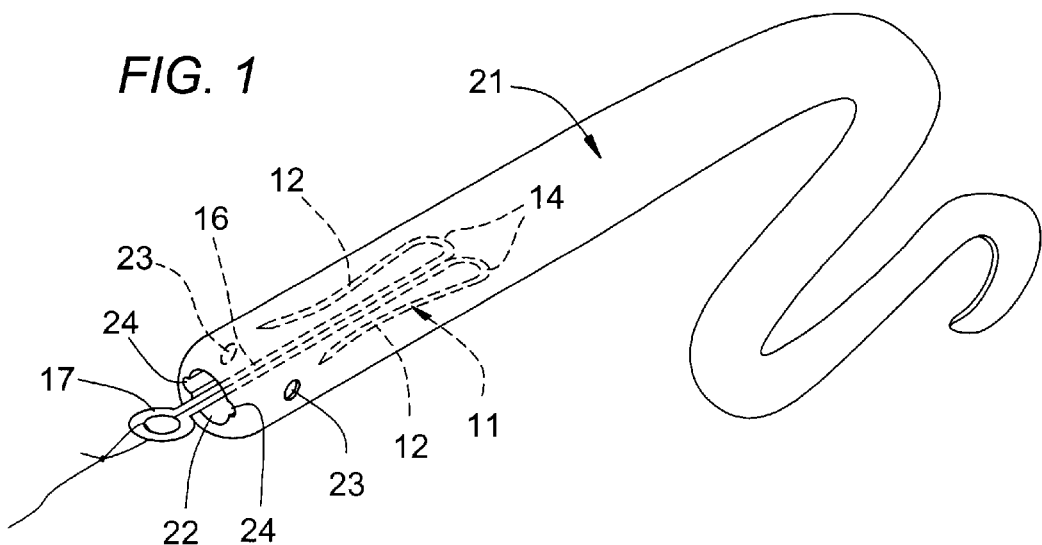
FIG. 1 is a perspective view of the present invention compressed within a typical fishing lure.
Figure 2:
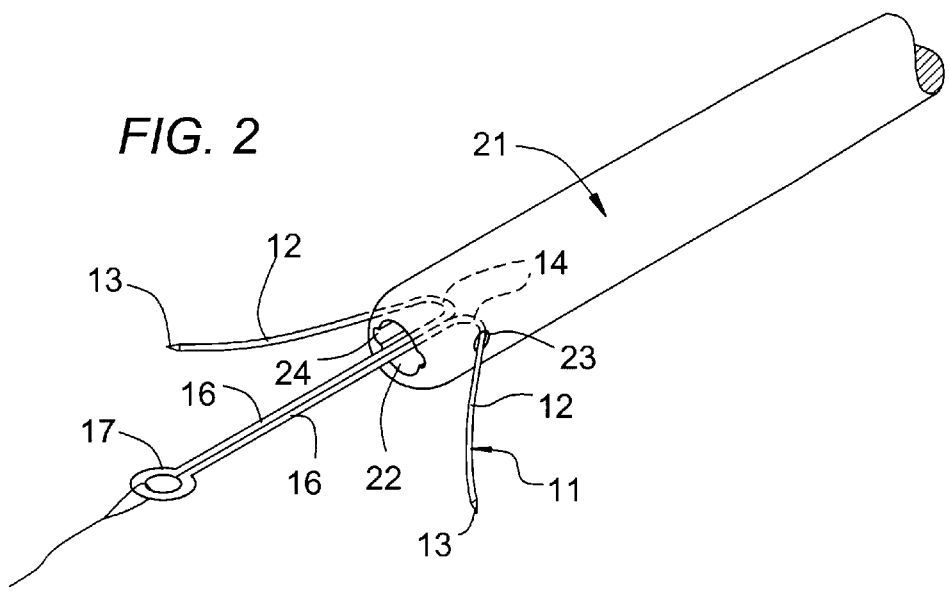
FIG. 2 is a perspective view of the present invention in an expanded state partially within a typical fishing lure.
Figure 3:
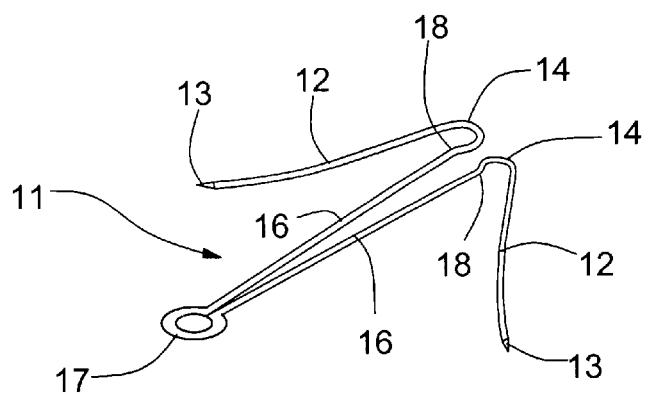
FIG. 3 is a perspective view of the preferred embodiment of the W-shaped member.
Figure 4:
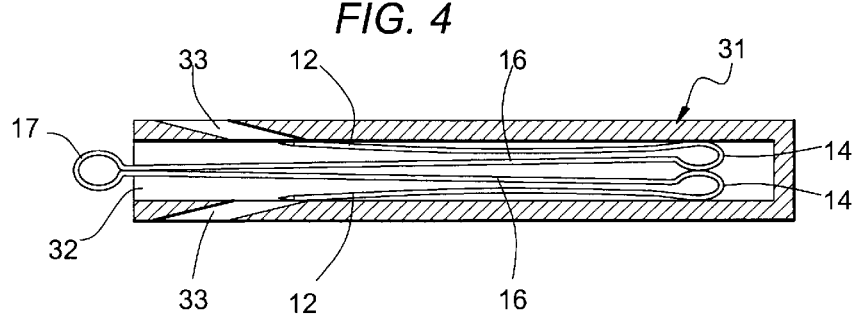
FIG. 4 is a sectional view of the present invention compressed within a compression sleeve.
Figure 5:
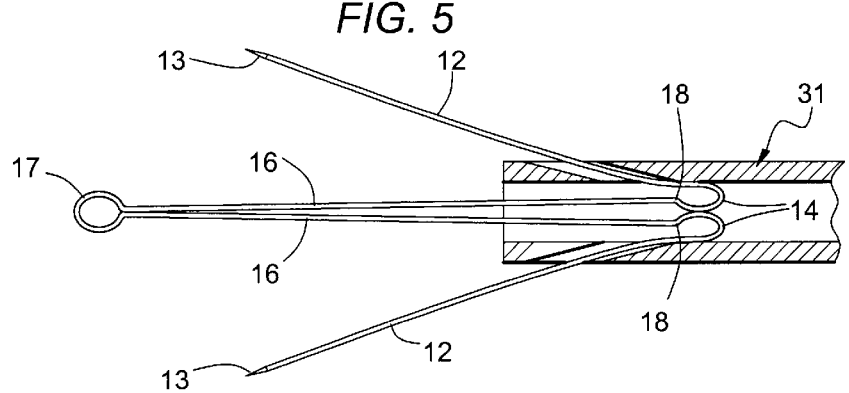
FIG. 5 is a sectional view of the present invention in an expanded state partially within a compression sleeve.
Figure 7:
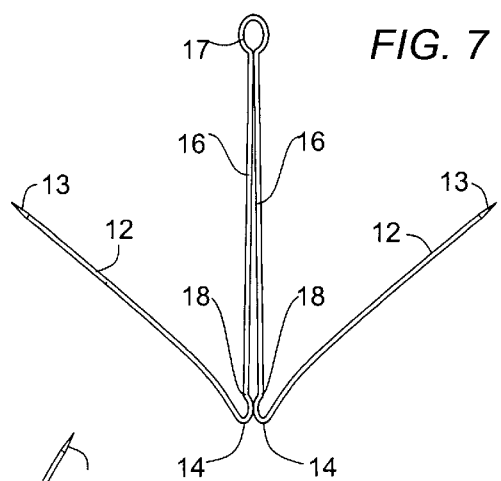
FIG. 7 is an elevational view of the W-shaped member with the outer legs form an angle of about 45° relative to the inner legs.
Figure 6:
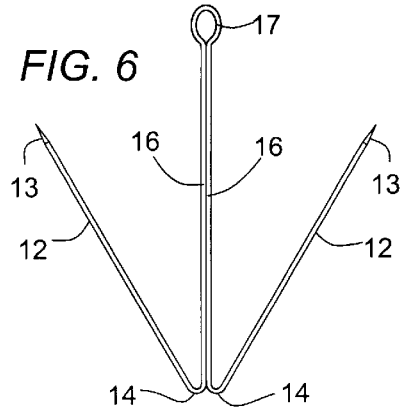
FIG. 6 is an elevational view of the W-shaped member with the outer legs forming an angle of about 30° relative to the inner legs.
Figure 8:
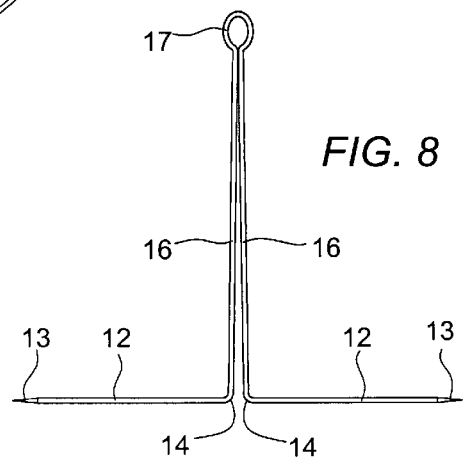
FIG. 8 is an elevational view of the W-shaped member with the outer legs forming an angle of about 90° relative to the inner legs.
Figure 9:
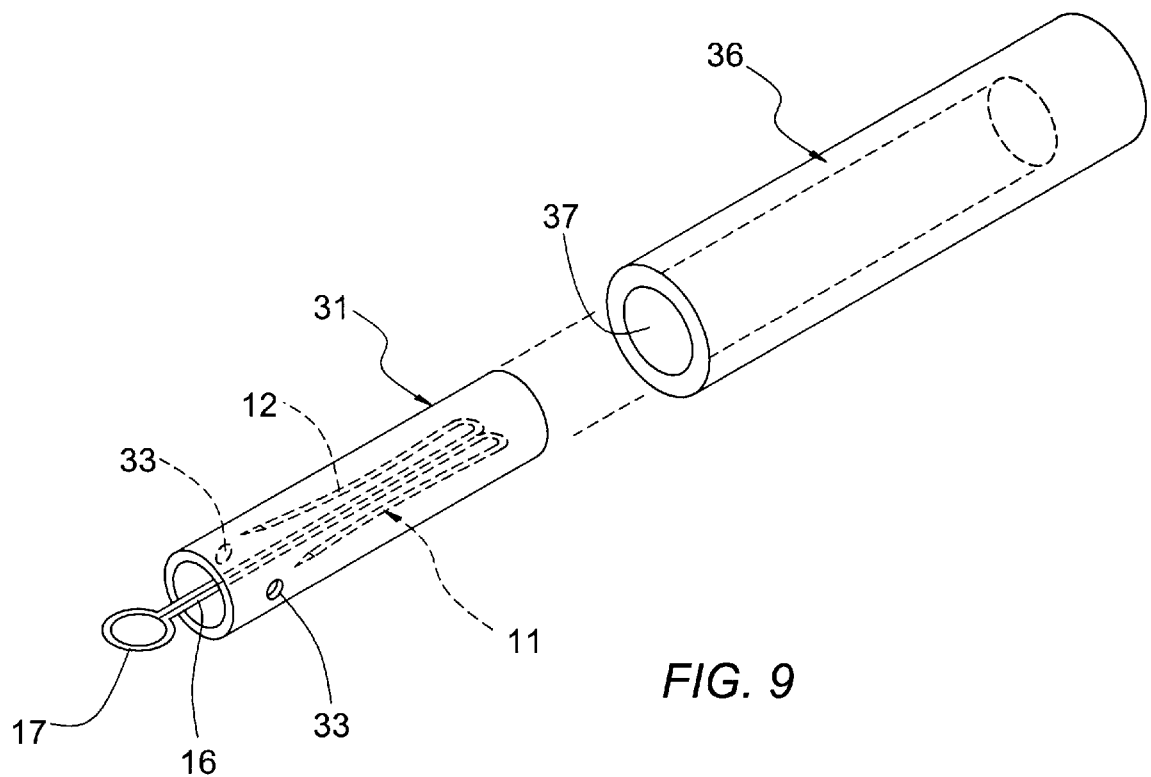
FIG. 9 is an exploded perspective view of a compression sleeve with the compressed W-shaped member therein and a typical fishing lure.
Figure 10:
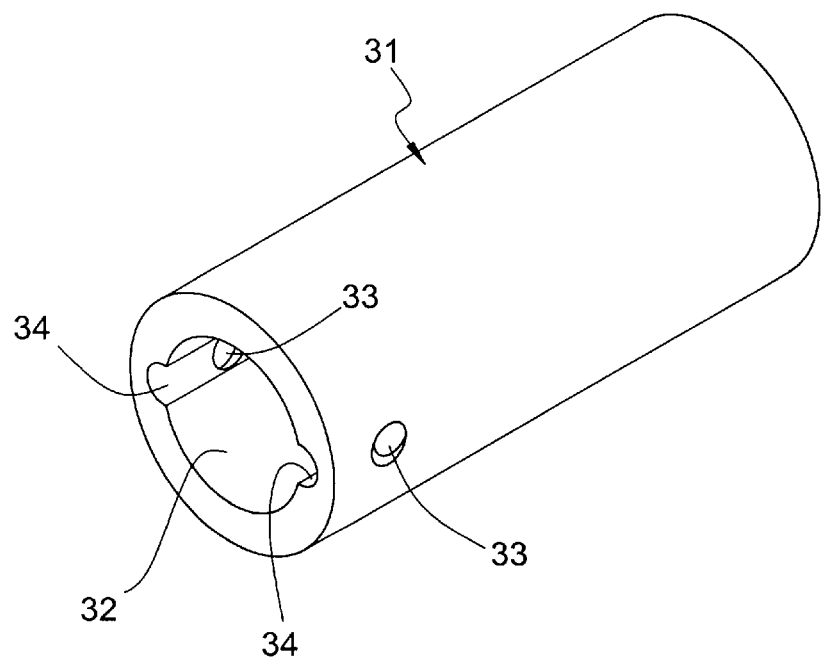
FIG. 10 is a perspective view of a compression sleeve.

A more complete understanding of the invention may be obtained by reference to the accompanying drawings wherein the apparatus comprises a W-shaped member 11 having outer legs 12 with sharpened ends 13, primary bends 14, inner legs 16, and an eyelet 17 formed thereon for attachment of a fishing line. Member 11 is preferably formed from a single strand of resilient wire comprising any suitable metals or metal alloys, such as a tempered stainless steel, and can have any workable thickness depending on the type of fish sought. Inner legs 16 can be parallel as shown in FIG. 6, or they can diverge from eyelet 17 as shown in FIGS. 7 and 8. Outer legs 12 can form angles relative to inner legs 16 from about 15° to about 90°, some examples of which are shown in FIGS. 6–8. Outer legs 12 can be curved as shown in FIG. 7, or they can be straight as shown in FIGS. 6 and 8. Member 11 can also have secondary bends 18 which act to converge inner legs 16 between secondary bends 18 and primary bends 14. In the preferred embodiment shown in FIG. 3, inner legs 16 slightly diverge from eyelet 17, outer legs 12 are curved outward, and secondary bends 18 are present.

Member 11 can be inserted into a fishing lure 21 having a cavity 22 formed therein for receiving member 11. Cavity 22 can have various diameters and can be conical in shape, depending on the shape and size of member 11, to facilitate functioning of member 11. Sharpened ends 13 on outer legs 12 are compressed toward eyelet 17 when member 11 is placed within cavity 22. Fishing lure 21 has opposing openings 23 through the wall defining cavity 22 such that sharpened ends 13 and outer legs 12 can extend therethrough. Openings 23 are preferably angled between about 15° and about 90° relative to the wall defining cavity 22 to facilitate sharpened ends 13 and outer legs 12 extension therethrough. Fishing lure 21 preferably has a pair of opposing grooves 24 formed along the wall of cavity 22 and intersecting openings 23 for guiding member 11 within cavity 22. If present, secondary bends 18 facilitate compressing member 11 into cavity 22 and extending outer legs 12 through openings 23 as member 11 is pulled partially from cavity 22.

In an alternate embodiment, the invention further comprises a compression sleeve 31 having at least one open end 32 for receiving member 11. Sleeve 31 can have various diameters and can be conical in shape, depending on the shape and size of member 11, to facilitate functioning of member 11. Sharpened ends 13 on outer legs 12 are compressed toward eyelet 17 when member 11 is placed within sleeve 31. Sleeve 31 has opposing openings 33 in the wall thereof such that sharpened ends 13 and outer legs 12 can extend therethrough Openings 33 are preferably angled between about 15° and about 90° relative to the wall of sleeve 31 to facilitate sharpened ends 13 and outer legs 12 extension therethrough. Sleeve 31 preferably has a pair of opposing grooves 34 formed on the inner surface thereof and intersecting openings 33 for guiding member 11 within sleeve 31. If present, secondary bends 18 facilitate compressing member 11 into sleeve 31 and extending outer legs 12 through openings 33 as member 11 is pulled partially from sleeve 31. The invention further comprises a fishing lure 36 having a cavity 37 formed therein for receiving sleeve 31. Sleeve 31 preferably comprises a material selected from the group consisting of synthetic thermoplastics such as nylon.

Figure 11:
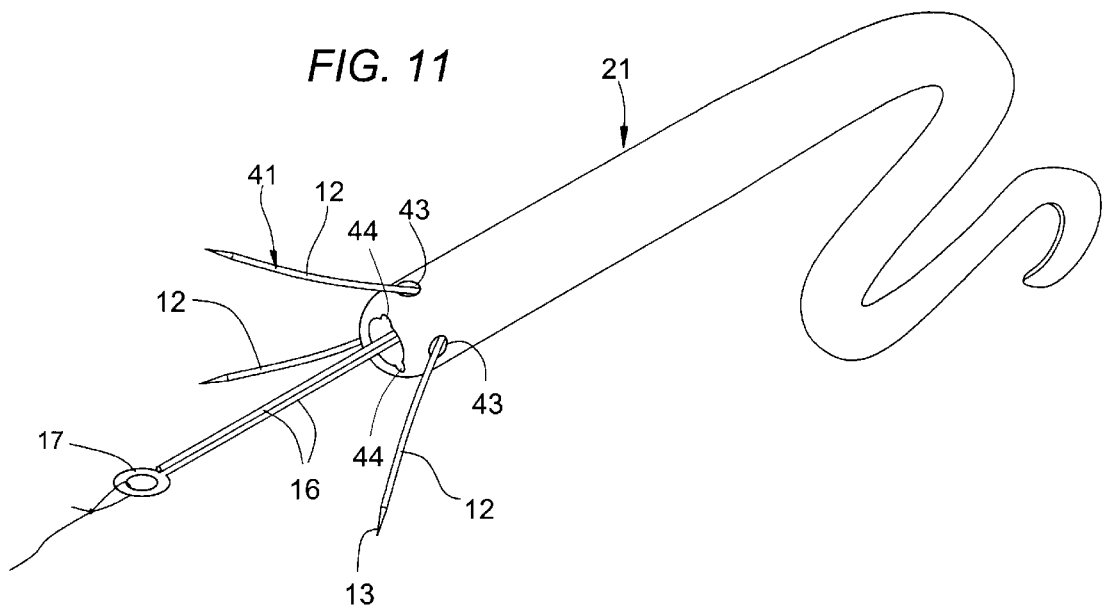
FIG. 11 is a perspective view of an alternate embodiment of the present invention utilizing a three-pronged member.
Figure 12:
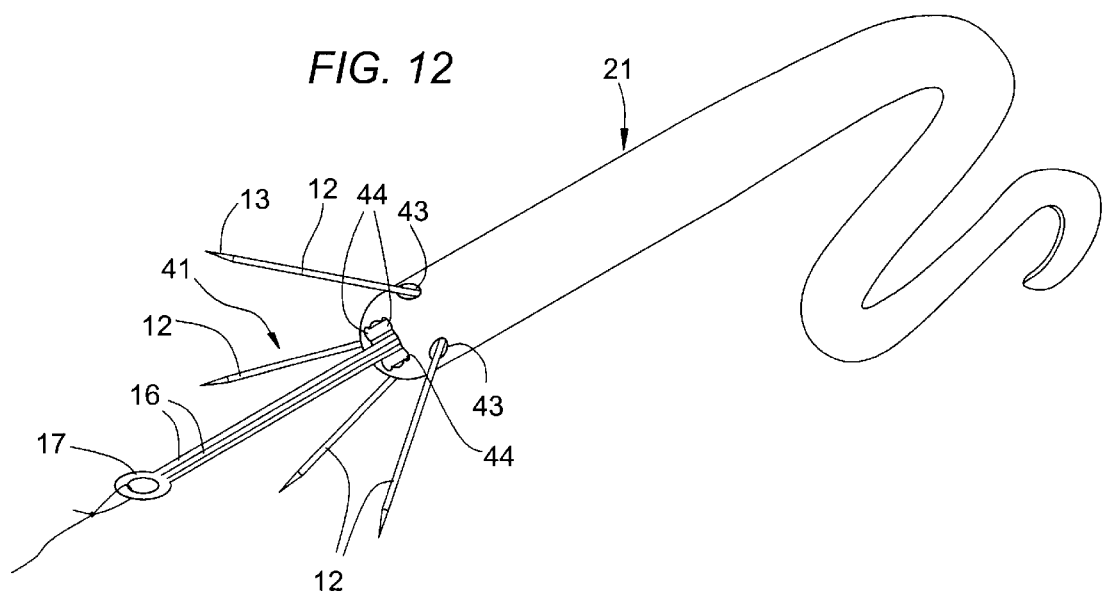
FIG. 12 is a perspective view of an alternate embodiment of the present invention utilizing a four-pronged member.

Other alternate embodiments of the present invention include a member having any workable number of prongs, however, it is preferable for the prongs to be symmetrically arranged for proper functioning. A three-pronged member 41 anchored within a lure is illustrated in FIG. 11, and a four-pronged member 42 anchored within a lure is illustrated in FIG. 12. Each of these alternate embodiments has openings 43 and grooves 44 equal in number to the number of prongs.

When a fish strikes the lure, the force on the fishing line pulls member 11 partially out of cavity 22, or sleeve 31, and sharpened ends 13 and outer legs 12 spring outwardly through openings 23, or openings 33, to engage the mouth of the fish. Member 11 can subsequently be easily removed from the mouth of the fish while minimizing injury to the fish by pushing the lure into the mouth of the fish, which simultaneously extracts sharpened ends 13 and outer legs 12 from the fish tissue while returning member 11 to its compressed state within cavity 22, or sleeve 31. The present invention differs from prior art spring loaded hooks in that the member is spring loaded such that only the outer legs 12 with sharpened ends 13 extend. The present invention can be adapted for use in many soft body lures, including but not limited to plastics, spinner baits, and flies, as well as hard body lures.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. An apparatus for catching fish, comprising:

a resilient member comprising at least two prongs extending in a symmetrical arrangement from an eyelet for attachment of a fishing line, wherein each prong comprises a curved outer portion having a barbless sharpened end, an inner portion connected to said eyelet wherein said inner portion has a curvature formed therein, and a bend connecting said inner portion to said outer portion at an angle between 15° and 90°; wherein said inner portions of said prongs diverge from each other from said eyelet and converge toward each other between said curvatures and said bends; and means for compressing said resilient member such that said barbless sharpened ends of said prongs are compressed toward said eyelet, comprising:
   a) a cavity for receiving said member therein;
   b) openings through a wall defining said cavity, equal in number to the number of said prongs, such that said barbless sharpened ends and said outer portions can extend therethrough, wherein said openings are angled relative to said wall of said cavity between about 15° and about 90°; and
   c) longitudinal grooves, equal in number to the number of said prongs, running along the inner surface of said wall and intersecting said opening for guiding said member within said compressing means.

* * * * *